Sept. 10, 1968  B. G. E. STIFF  3,401,102
ELECTROLYTIC SHAPING APPARATUS AND FEED RATE CONTROL
THEREFOR, BASED ON FIELD CHANGES ACROSS THE GAP
CAUSED BY A MOVING ELECTRODE
Filed July 29, 1965  5 Sheets-Sheet 1

INVENTOR.
Bernard G. E. Stiff
BY
Roberts, Cushman & Grover
ATT'YS

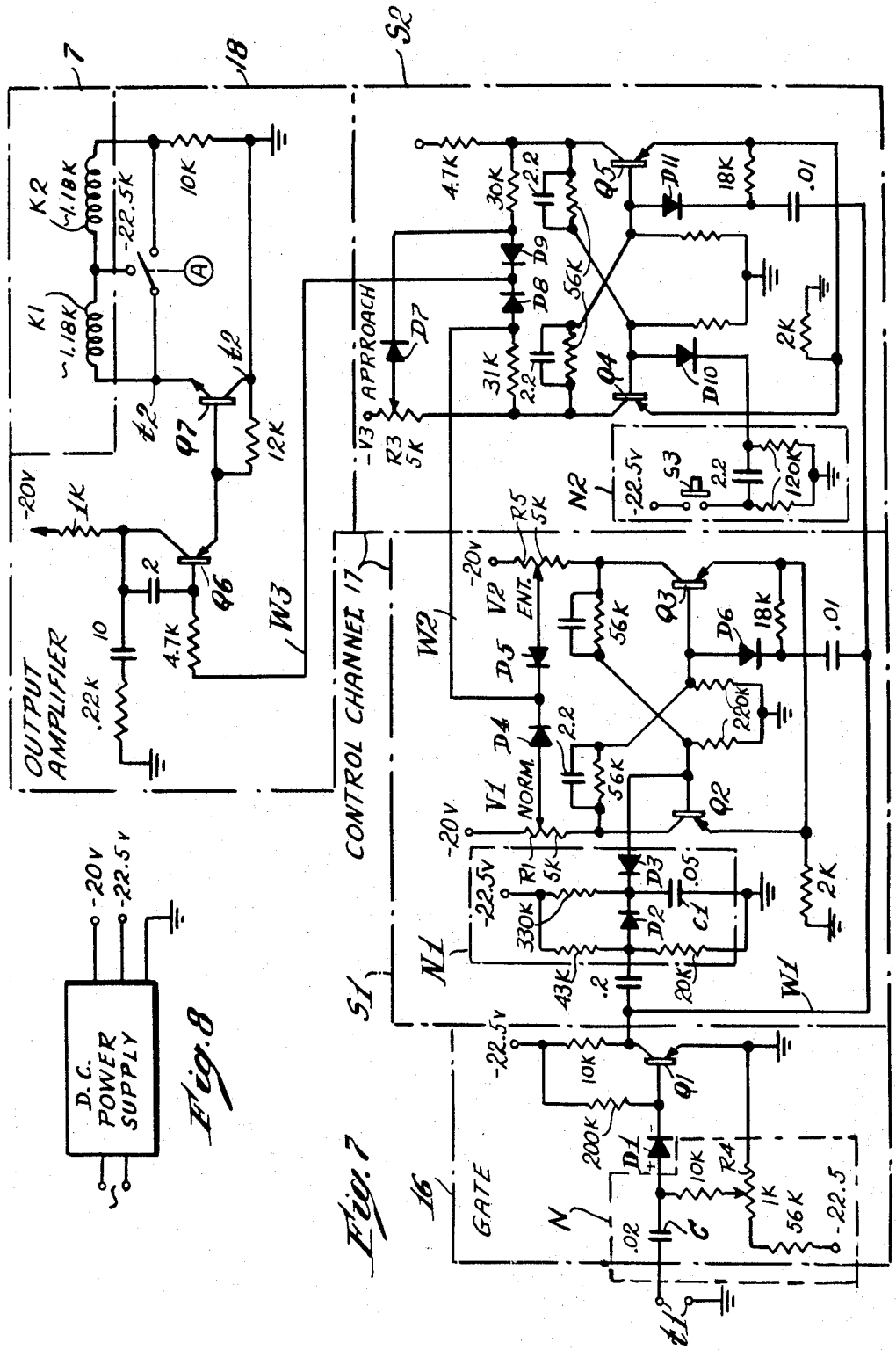

United States Patent Office 3,401,102
Patented Sept. 10, 1968

3,401,102
ELECTROLYTIC SHAPING APPARATUS AND
FEED RATE CONTROL THEREFOR, BASED
ON FIELD CHANGES ACROSS THE GAP
CAUSED BY A MOVING ELECTRODE
Bernard G. E. Stiff, Lynnfield, Mass., assignor, by mesne
assignments, to The Lapointe Machine Tool Company
Limited, Otterspool, Watford, Hertfordshire, England,
a company of Great Britain
Filed July 29, 1965, Ser. No. 475,704
18 Claims. (Cl. 204—143)

This invention relates to electrolytic shaping of metals with the apparatus shown and described in my pending application Ser. No. 440,885, filed Mar. 18, 1965, and especially to feed rate control means for apparatus of the foregoing kind.

The apparatus referred to comprises essentially a rotating wheel having a peripheral edge face complementary in contour to the shape to be imparted to the workpiece, a support for holding the workpiece adjacent the edge of the wheel and for movement linearly relative to the wheel to present successive incremental portions of the workpiece continuously to the wheel, means for connecting the wheel and work to the negative and positive sides of the source of direct current, and means for supplying an excess of electrolyte in the form of a substantially continuous stream to the gap between the wheel and work. A high degree of accuracy is obtained with the aforesaid apparatus by employing a wheel which has a smooth edge face, that is, a face free from projecting abrasives and/or insulating particles, but which contains a plurality of regularly recurrent slots which trap and carry the electrolyte forcibly into intimate contact with the work as more fully described in the aforesaid application. In that application the feed, that is, movement of the work support relative to the wheel, was related to be effected by manual means or power means. The principal objects of this invention are to provide means for controlling the rate of feed of the work support when power is employed so as to maintain the work at an optimum distance from the wheel for precision shaping; to provide a control which is independent of current densities, voltage fluctuations, polarization, kind and concentration of electrolyte, temperature and pressure of electrolyte, turbulence, sludge, and the like; to provide a control which is independent of the material of the working element and/or the workpiece and the relative geometry between the two; to provide a control which is responsive to changes in the gap and virtual contact between the wheel and workpiece to initiate substantially instantaneous correction; to provide a control circuit which operates to bring the workpiece and wheel rapidly into shaping relation and thereafter to constantly adjust the gap to maintain optimum shaping conditions; to provide a control in which the feed is unidirectional thereby avoiding the difficulties inherent in reversal of feed; and to provide a control means which is reliable and embodies a minimum amount of circuitry.

The foregoing objects are achieved herein by means of a working element embodying means for producing recurrent changes in the field between the working element and workpiece, and means responsive to said field changes operative to change the rate of feed to maintain an optimum gap between the working element and workpiece. The preferred working element is a wheel and may contain a plurality of equally spaced inserts of different metal or non-metallic material. However, in the illustrated apparatus the signals are produced by means of slots in the edge of the wheel or, more particularly, the trailing, relatively sharp outer edge of each slot in the direction of rotation operates as it enters the workpiece to produce a pronounced change in the field across the gap. As pointed out above, the wheel is only one form of working element or electrode which may be used. As is apparent to those skilled in the instant art the electrode may have configurations other than a circular periphery. As a wheel electrode has an endless surface which always provides a point on said surface closest to a workpiece maintained at a constant distance and direction from a point on the means supporting the wheel so have other electrode of various other configurations which move the endless surface through the point most proximate to the workpiece. The changes in field collectively produce cyclical pulses or signals, the amplitude of which changes with the width of the gap between the workpiece and wheel. A sensing device is employed in the circuit which is responsive to changes in the amplitude of the cyclical signals at a predetermined level to increase the rate of feed of the feeding means and to signals of a greater magnitude, produced at confrontation of the wheel and workpiece and at virtual contact of the wheel and workpiece, to decrease the rate of feed. The sensing device is also responsive to the signal of greater magnitude at the termination of the shaping operation to reduce the rate of feed.

As illustrated, the apparatus embodies a moving working element, a movable carrier for holding a workpiece, drive means for feeding the carrier and workpiece relative to the element, means for adjusting the feed rate of said drive means and therefore the gap between said workpiece and working element, means for supplying electrolyte in said gap, an electrical supply connected to apply an electrical field across the gap, and means responsive to variations in the field to produce a control signal to cause the adjusting means to vary the feed rate of the driving means; and is characterized in that the working element comprises means for superposing recurrent variations on the field, the amplitude of which varies with the width of the gap, and in that the responsive means comprises means selectively responsive to the recurrent field variations to produce a control signal operative to cause the adjustable means to increase the rate of feed so that it exceeds the rate of dissolution and to other signals produced at inception, virtual contact and termination to cause said adjustable means to decrease the rate of feed so that it is less than the rate of dissolution.

The control means which is responsive to the aforesaid signals comprises essentially a circuit having input means receiving the signals, output means connected to feed rate adjusting means, and a control channel connected between the input and output means including switching means having at least two stable states in each of which it produces control signals of different amplitude, the switching means being differently sensitive to recurrent variations of different amplitude to change the switching means between the aforesaid states.

The control channel comprises gate means passing a control signal of predetermined amplitude and the switch means is connected to the gate to make the transfer between the two states in response to a control signal of predetermined amplitude. At least two voltage sources of different values are provided and the switching means connects one of the sources to the output means in one of the states and the other of the sources to the output means in the other of said states. A third voltage source is provided and the switching means has a third state in which it respectively connects the third voltage source to the output means. A manual switch provides for transferring the aforesaid switching means to the third state while the working element and workpiece approach working relation with each other so as to cause the adjusting means to increase the feed rate of the drive means and is operable, when the working element moves into working relation with the workpiece, to transfer the switching means to one of the two states, thereby to reduce the feed rate of the drive means during entrance.

The invention will now be described in greater detail with reference to the accompanying drawings wherein.

Figure 5:
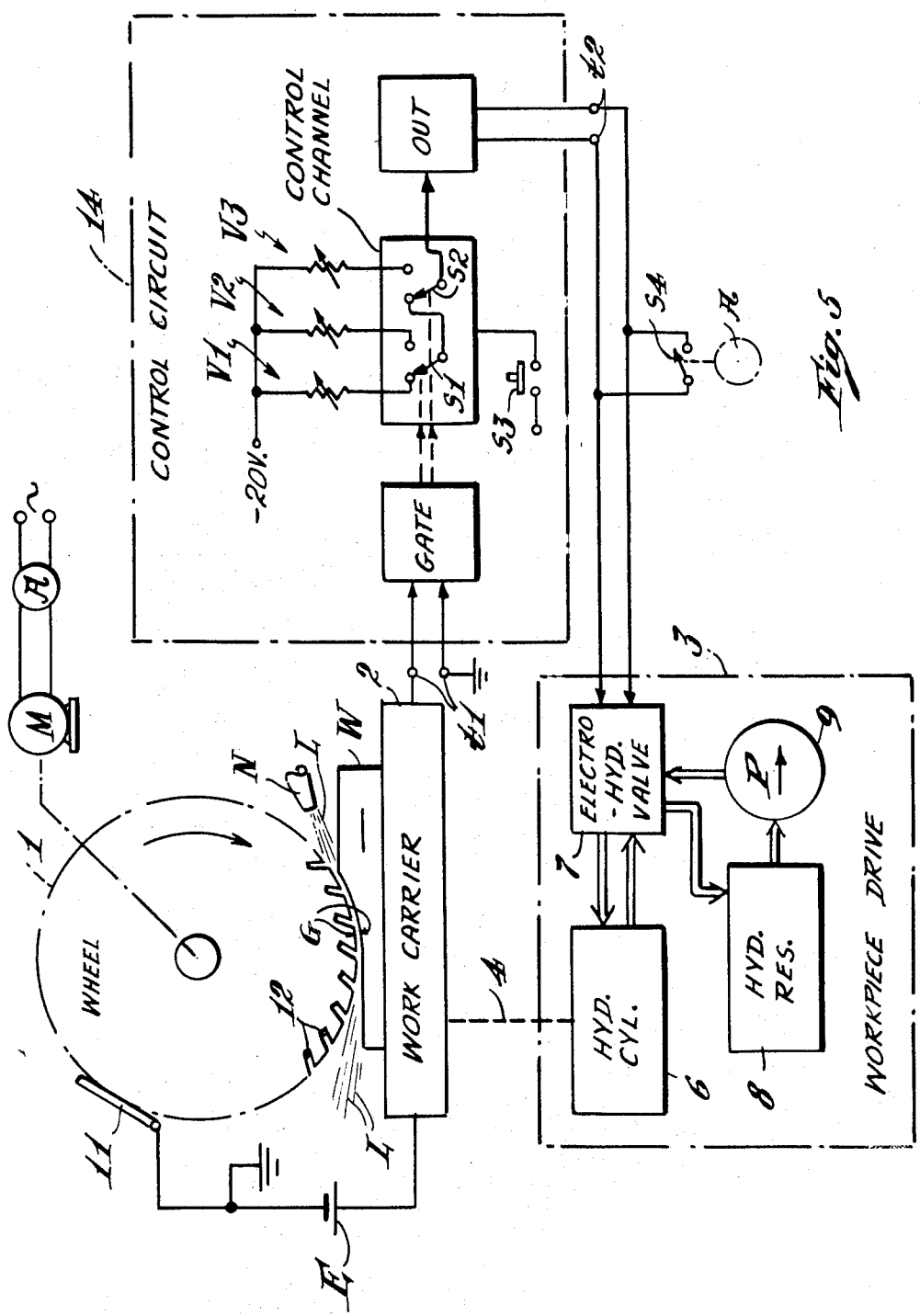
Figure 6:
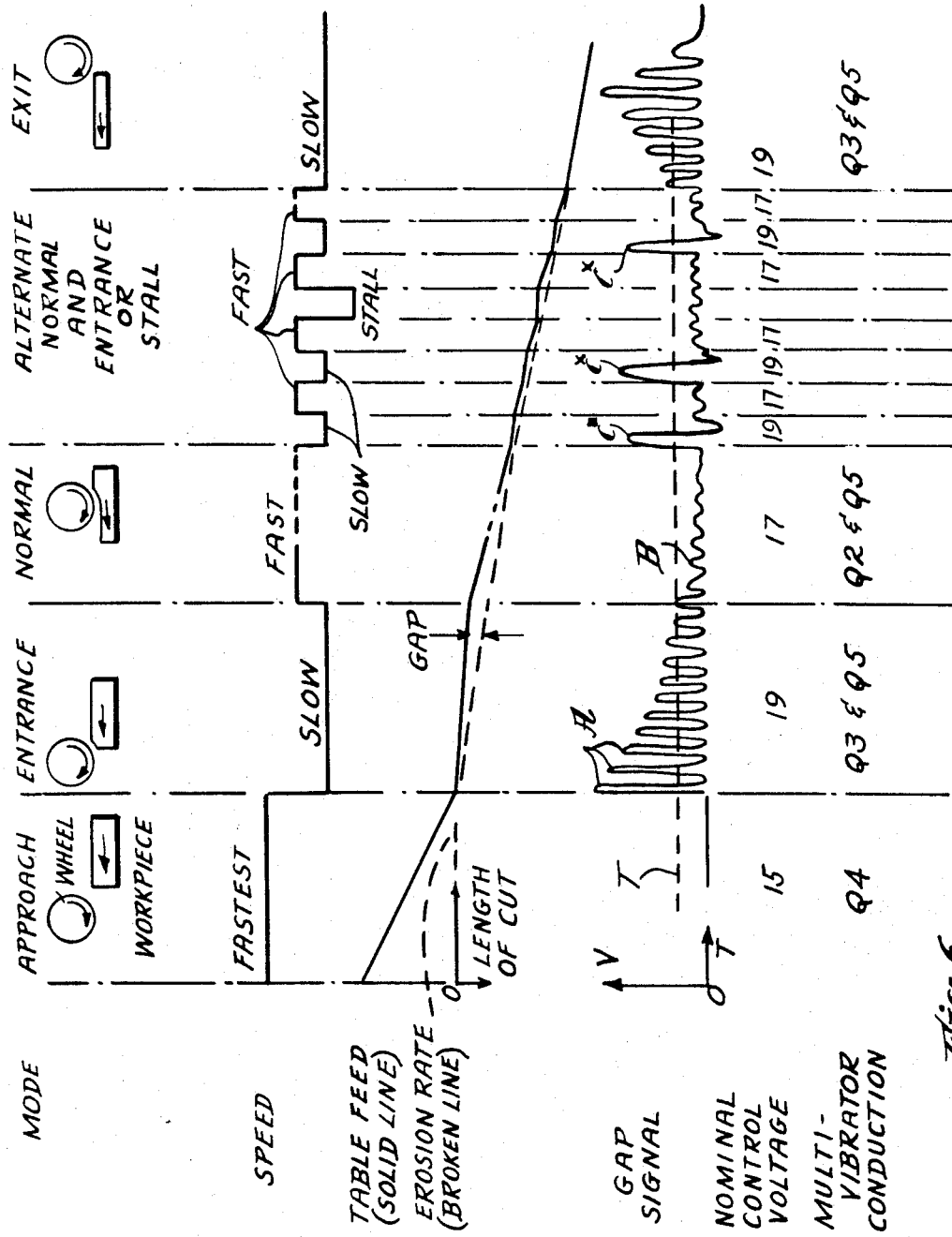

FIG. 5 diagrammatically illustrates the control circuit for controlling the rate of feed of the work support relative to the wheel;

FIG. 6 is a graph of the different rates of feed provided by said control;

FIG. 7 illustrates the electrical control circuit; and

FIG. 8 illustrates a power source suitable for said control.

The example of material working apparatus shown in FIG. 5 is an electrolytic shaping machine whose working element is a shaping wheel 1 driven by a motor M. A workpiece W is secured to a carrier 2 such as a magnetic chuck which feeds the workpiece under the wheel. The carrier 2 and workpiece are moved by a drive 3 comprising a piston 4 driven by a hydraulic cylinder 6 under the control of an electro-hydraulic valve 7; the valve being supplied with hydraulic fluid from a reservoir 8 by a pump 9. As in prior electrolytic shaping machines, an excess of electrolytic liquid L is supplied in the gap G between the wheel 1 and the workpiece W, and an electrical potential is applied across the gap. As illustrated, a battery E is connected to the work carrier 2 and through a brush 11 to the wheel 1, the wheel, workpiece and carrier being electrically conductive. The negative terminal of the battery E, which is connected to the wheel, is grounded. As the wheel rotates a complex electrochemical reaction on the workpiece surface in the gap results in erosion of the surface, although the wheel does not normally close the gap by contacting the surface of the workpiece. As set forth in my copending application Ser. No. 440,885, filed Mar. 18, 1965, markedly increased speed and precision of shaping is possible by forming slots or voids 12 extending inwardly from the periphery of the wheel.

It has been discovered that rotation of the slots 12 past the gap G also imposes on the electrical field across the gap field variations which recur at a distinctive rate, usually at the frequency with which the slots pass the gap, i.e. the product of the revolution rate of the wheel and the number of slots in its periphery. Prior to entrance of the wheel into the work this recurrent signal is high in amplitude and diminishes below a predetermined level as the wheel enters the work. These field variations are picked up at the input terminals t1 of a control circuit 14. One terminal t1 is connected through the carrier 2 to the workpiece at one side of the gap. The other terminal t1 is connected to the ground potential of the negative side of battery E.

The control circuit 14 includes a gate stage 16 which passes the high amplitude recurrent variations and blocks those below the predetermined threshold. The gate circuit influences the condition of a control channel 17 which has three sources of potential V1, V2 and V3 determined by the setting of three potentiometers R1, R2 and R3. One of the three voltages is selected according to the condition of two switches S1 and S2 and applied to an output stage 18 which delivers to its output terminals t2 one of three corresponding output signals for the electrohydraulic valve 7.

The electro-hydraulic valve 7 is differently responsive to the three output signals to cause the hydraulic signal to move the work carrier at one of three speeds, a fastest speed or approach of the wheel to the workpiece, a slow speed during entrance of the wheel into the work and an intermediate speed for normal erosion of the work. A suitable valve is shown and described in Technical Bulletin P-165 published by Pegasus Laboratories, Inc., of Berkley, Mich.

The switches S1 and S2 are initially in the position shown in FIG. 5 after a manual switch S4 is momentarily closed. In these positions the voltage V3 is connected by the two switches to the output stage 18, and the workpiece driven at its fastest speed.

When a high amplitude recurrent signal is applied to the gate stage 16, it causes both switches S1 and S2 to transfer, thereby connecting voltage V2 to the output stage. Voltage V2 causes the workpiece to be driven at a slow speed. As the recurrent field signals fall below the threshold of the gate only switch S1 transfers back to connect voltage V1 to the output stage resulting in the driving of the workpiece at the normal intermediate speed.

Under normal operating conditions the work support is advanced at a relatively fast rate of feed (approach feed) to move the workpiece into operative relation with respect to the working element without time consuming delay. At a distance of approximately .050 inch, signals of relatively high amplitude are produced in the field across the gap by reason of rotation of the working element relative to the workpiece and to the relatively narrow area of the workpiece confronting the working element. These signals are employed to reduce the rate of approach speed of the workpiece toward the work element to a rate less than the rate of dissolution of the workpiece. This enables dissolution to take place while the confronting area of the workpiece is relatively small and the dissolution rate correspondingly slow without crashing of the workpiece into the working element. As the area of confrontation of the workpiece with the working element increases and the gap increases due to the greater rate of dissolution, the amplitude of these signals decreases and at a predetermined lower amplitude the signals of lower amplitude are employed to increase the rate of feed so as to exceed the rate of dissolution by a small amount and thereby begin to close the gap. As the operation continues the gap closes to virtual contact whereupon a signal of relatively high magnitude is produced which is used to decrease the rate of feed to avoid crash and to widen the gap. Thereafter the rate of feed is alternately increased and decreased by the signals of predetermined lower magnitude at maximum gap and the signals of high magnitude at virtual contact. This alternate increase and decrease in rate of feed continues until the end of the shaping operation at which point the reduction in area of the workpiece opposite the working element decreases and thereby produces signals of relatively high magnitude which are used to decrease the rate of feed so that in spite of the lesser rate of dissolution sufficient time will be provided to complete the shaping operation.

Throughout the operation an excess of electrolyte is maintained between the working element and the workpiece in spite of the decrease in the width of the gap and virtual contact between the working element and workpiece by reason of the fact that the slots in the working element carry finite unvarying quantities of the electrolyte through the zone of electrolytic dissolution of a predetermined amount independent of the size of the gap and at such a rate as to maintain a substantially continuous phase of electrolyte throughout the operation. Maintenance of a continuous phase of electrolyte independent of the gap enables an intimacy between the working element and workpiece without actual contact which results in repeatable accuracy in reproduction.

Figures 1, 2:
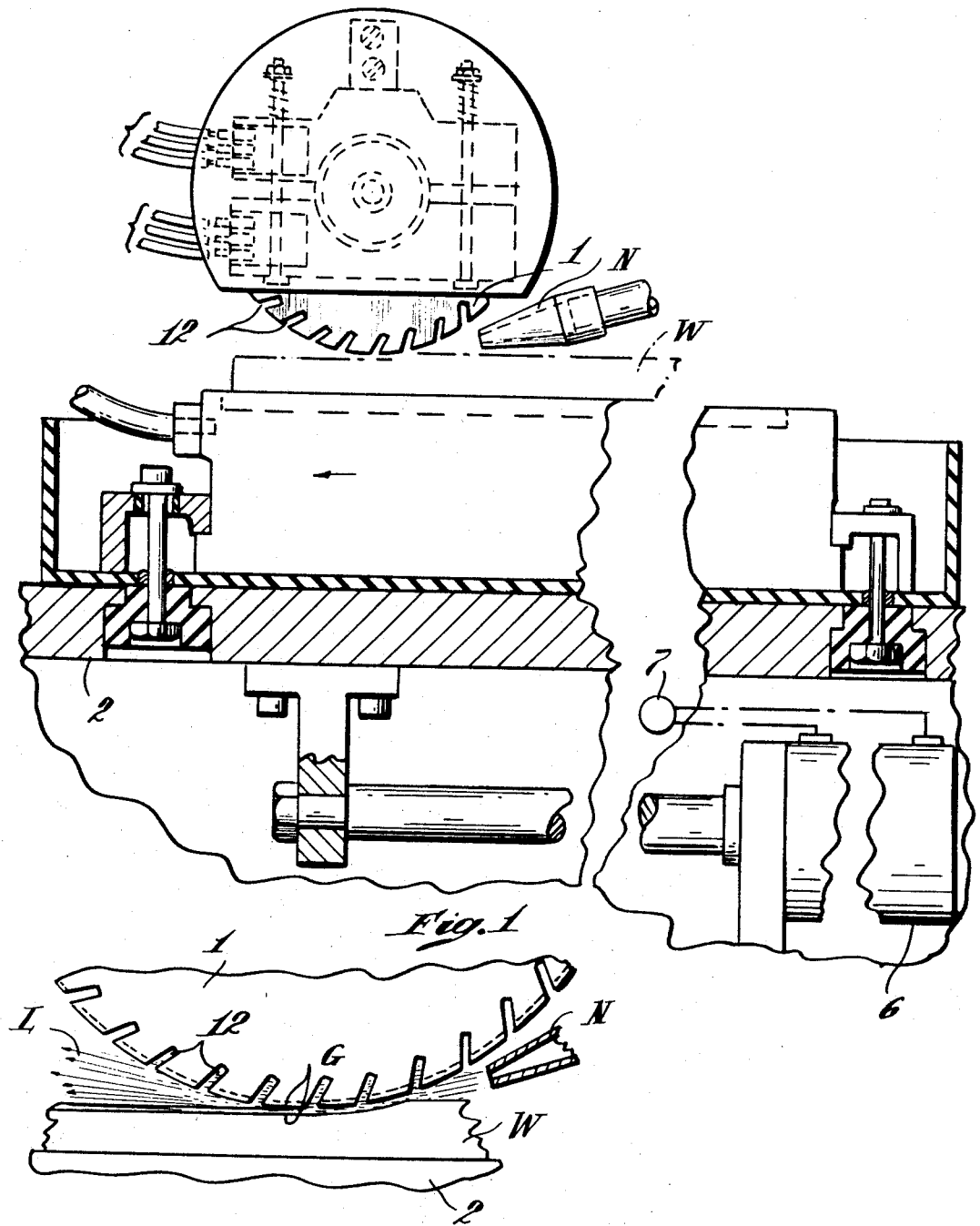
FIG. 1 is a fragmentary elevation of the apparatus for effecting electrolytic shaping, showing a work support, a working element in the form of a wheel supported above the work support and a nozzle for supplying electrolyte, with a workpiece shown in dot and dash lines situated between the work support and the wheel.
FIG. 2 is a view of the lower part of the wheel in elevation, part way along in the course of shaping of the workpiece, showing the latter in section.
Figure 2A:
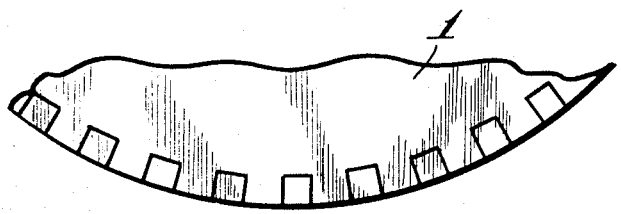
FIG. 2a is a fragmentary elevation of a working element containing inserts at its edges in lieu of recesses.
Figure 3:
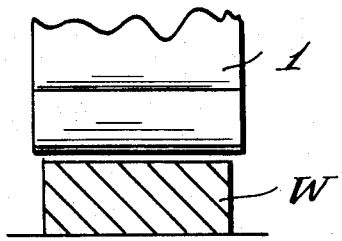
FIG. 3 is a fragmentary elevation taken transversely of the wheel showing a wheel having a flat peripheral surface for forming a flat surface on the workpiece.
Figure 4:
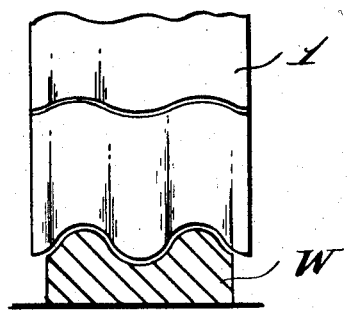
FIG. 4 is a fragmentary elevation taken transversely of the wheel showing a wheel having a contoured peripheral surface for forming a correspondingly shaped surface on the workpiece.

FIGS. 1, 2, 3 and 4 illustrate the apparatus diagrammatically shown in FIG. 5 with a slotted wheel, the peripheral surface of which may be flat as shown in FIG. 3, or contoured as shown in FIG. 4. FIG. 2a shows an unslotted wheel containing inserts of different material which will produce the signals referred to above and which may be used for controlling the proximity of the wheel and work in apparatus of this kind where slots are not employed.

CONTROL CIRCUIT

A suitable control circuit which is not per se a part of this invention, is shown in FIG. 7. The control circuit is provided with voltages of −20 volts and −22.5 volts by a conventional direct current power supply shown in FIG. 8.

In FIG. 7 the values of the resistors are indicated in ohms and the values of the capacitors are indicated in microfarads. Diodes D1 to D11 are type 1N306A; transistors Q1 to Q6 are type 2N404A; and transistor Q7 is type 2N699.

The control circuit 14 comprises the gate stage 16, a control channel 17 including multivibrator switches S1 and S2, and an output amplifier 18 connected through output terminals t2 to the control coils K1, K2 of the electrohydraulic valve 7. The gap signal is applied to terminals t1 at the input to the gate stage 16.

The gate stage 16 comprises input terminals t1 to which the recurrently varying gap signal is applied. This signal is transmitted through a diode D1 to the base of a gate transistor Q1. A 1 kilohm potentiometer R4 is adjusted to apply a voltage of approximately −0.2 volts at the positive terminal of the diode D1. The base of the transistor Q1 is held at about −0.1 volt. Thus the diode D1 is normally back biased by about 0.1 volt. A signal of +0.1 volt is thus necessary to cause D1 to conduct. The emitter of transistor Q1 is more positive than its base and the transistor Q1 is normally conducting at saturation. When a gap signal above a threshold of +0.1 volt or greater is transmitted by the diode D1, the transistor Q1 is cut off and its emitter voltage momentarily drops toward the −22.5 voltage of the emitter supply transmitting a negative spike. This spike is momentarily blocked by diode D2, but is transmitted by a conductor W1 and diodes D6 and D11 respectively to the bases of transistors Q3 and Q5 of multivibrators S1 and S2.

The input to the gate circuit 16 comprises a network N selectively responsive to the fast rise time characteristic of the recurrent gap signal. This network includes a condenser C which, with the associate resistance of the network has a time constant substantially faster than any direct current variations attributable to variations in the width of the gap. Thus the gate circuit is unresponsive to such direct current variations and is responsive only to changes in the field across the gap substantially faster than variations in the width of the gap such as the recurrent gap signal.

The first multivibrator S1 comprises two transistors Q2, Q3 connected in a conventional bistable multivibrator circuit. However, in the absence of a spike signal transistor Q2 is biased to saturation by a voltage dividing network N1 which applies a potential of about −6 volts to the base of Q2. Transistor Q3 is thereby held cut off and the multivibrator S1, though bistable in design, is held in a monostable condition by the biasing network in the absence of a spike signal. The output voltage of multivibrator S2 is taken along a conductor W2 either from a potentiometer R1 in the collector supply for transistor Q2, or from a potentiometer R2 in the collector supply for transistor Q3 depending on which transistor is conducting, and further depending on the condition of multivibrator S2. As will be explained hereinafter, the setting of potentiometer R1 determines the normal rate of feed of the workpiece carrier 2, and the setting of poteniometer R2 determines the entrance rate.

The second multivibrator S2 comprises two transistors Q4 and Q5 connected as a conventional bistable multivibrator. No external bias is applied, and the multivibrator may remain in either of its states. However, a manual switch S3 in a voltage dividing network N2 may be closed to apply a negative voltage to the base of transistor Q4 and cause it to conduct to saturation if it is not in that state. Thereafter, the multivibrator will remain in that state until a spike signal is applied to the base of transistor Q5. The output of multivibrator S2 is taken from a potentiometer R3 in the collector supply for transistor Q4. Setting of this potentiometer determines the rate of feed of the workpiece carrier 2 while the workpiece approaches the shaping wheel 1 from a distance.

As will be more fully explained one of the three voltages available from the three potentiometers R1, R2 and R3 is selected according to the states of the multivibrators and applied through a conductor W3 to the base of an emitter follower Q6. The transistor Q6 develops at its emitter a voltage proportional to one of the three possible multivibrator output voltages at its base, the emitter voltage being applied to the base of a power amplifier Q7. The emitter of the power amplifier Q7 is connected through one output terminal t2 to one coil K1 of the electro-hydraulic valve 7 to a supply of −22.5 volts. The other coil K2 of the valve is connected through a 10 kilohm resistor to the other, grounded output terminal t2. The coils K1 and K2 are approximately equal in impedance, and with equal applied currents cancel each others fields and hold the hydraulic valve closed. However, the settings of the three potentiometers R1, R2 and R3 produce at the emitter of transistor Q7 one of three control voltages less than −22.5. Typically the voltages are −15 for approach (R1), −19 for entrance (R2), and −17 for normal (R3). Since the rate of fluid valving, and hence the speed of the workpiece table 2, is slowest when the voltage is highest, the voltage of −15 will produce the fastest feed during approach, the voltage of −19 will produce the fast feed during entrance of the cutting wheel into the workpiece, and the voltage of −17 will produce an intermediate, fast feed rate during normal cutting at or approaching a minimum gap between the shaping wheel 1 and the workpiece W.

The three potentiometers are not only independently adjustable but also the voltages they provide are independent of the peak amplitude of the gap signal. Thus control of the feed rate is independent of the signal input.

The operation of the circuit of FIG. 7 is shown in FIG. 6 and is as follows:

APPROACH MODE

During approach of the shaping wheel 1 to the workpiece W, the wheel is so far spaced from the work that no signals are applied to the input terminals t1. When the manual switch S1 is momentarily closed, transistor Q4 is caused to conduct to saturation and multivibrator S2 assumes that stable state. Conduction of transistor Q4 reduces the negative voltage at its emitter toward ground potential, typically to about −6 volts. This voltage is applied through conductor W1 to the junction of diodes D4 and D5 thereby back biasing diodes D4 and D5 and blocking off the voltages at the center taps of potentiometers R1 and R2. Conduction of Q3 also back biases diode D8 blocking off the collector of Q3. While transistor Q4 is conducting to saturation transistor Q5 is cut off forward biasing diodes D7 and D9 and thereby connecting potentiometer R3 through diodes D7 and D9, conductor W3 and to the base of transistor Q6. The voltage selected by presetting the approach potentiometer R3 is thereby applied to transistor Q6 which causes the power amplifier Q7 to apply the approach control voltage of −15 volts to the coil K1 of the electrohydraulic valve 7. The valve then causes the hydraulic cylinder 6 to drive the piston 4 and workpiece carrier 2 at the fastest rate toward the shaping wheel 1, and the system is in its approach mode.

ENTRANCE MODE

As the gap between the workpiece and wheel closes sufficiently to hold some electrolyte, the wheel generates recurrent variations in the field across the gap. Initially these variations as detected at terminals $t1$ are high in amplitude, above the threshold voltage T (+0.1 volt) of diode D1, as shown at A in FIG. 6. The signals A are passed by the diode D1 to the gate transistor Q1 which produces a negative voltage spike, in the order of −22 volts, at its collector. One spike is produced for each variation A of the input signal.

The negative spikes back bias diode D2 momentarily and are therefore diverted on conductor W2 to transistors Q4 and Q6, driving both transistors to conduction and reversing the states of both multivibrators S1 and S2. The second multivibrator S2 being bistable and without external bias remains in the new stage with transistor Q5 conducting to saturation. Also transistor Q3 of the first multivibrator is caused to conduct, and remains conductive so long as the spikes occur at or near the multivibrator period of 0.0001 to 0.0005 second. With transistors Q3 and Q5 conducting, potentiometer R1 is blocked off and diode D5 connects the entrance potentiometer to conductor W2, while diode D8 connects conductor W2 to conductor W3. As a result the selected voltage of potentiometer R2 is applied to transistor Q6, causing the power amplifier Q7 to apply a potential of about -19 volts to coil K1. The hydraulic valve is thereby adjusted to a slow feed rate and the system assumes the entrance mode.

NORMAL MODE

As the cutting wheel slowly enters the workpiece the recurrent variations in the field of the gap decrease in amplitude, and the corresponding signal B at terminals $t1$ drops below the threshold voltage T of the diode D1. When the signal is no longer passed by diode D1, the gate transistor Q1 ceases transmitting spikes to the base of transistor Q3 which therefore returns to cut off as the external bias network N1 returns transistor Q2 to saturation. With Q2 and Q5 conducting, diode D4 connects the normal potentiometer R1 to conductor W2 blocking off potentiometer R2. As in the entrance mode, diode D8 connects conductor W2 to conductor W3. As a result the selected voltage of the normal potentiometer is connected to transistor Q6, causing the amplifier Q7 to apply a potential of about -19 volts to coil K1. The hydraulic valve is thereby adjusted to the fast rate, intermediate the faster approach rate and the slow entrance rate, and the system enters the normal mode in which the workpiece feed is slightly faster than the rate at which the shaping wheel erodes the workpiece.

CRASH MODE

Since it is the object of the control circuit to keep the gap at a minimum short of actually contacting the work with the wheel, the fast normal rate of feed narrows the gap which widened during approach, as shown in FIG. 6, and causes the work to approcah but not quite make contact with the wheel. This condition is termed a crash condition and causes the generation of a distinctive crash signal C$x$ which rises above the threshold voltage T. Similarly as does the high amplitude signal A, the crash signal C$x$ has a fast rise time and causes transistor Q3 to conduct and connect the entrance potentiometer R2 to the output amplifier 18, thereby momentarily returning the work feed rate to the slow speed of the entrance mode. The system alternately approaches crash and momentarily slows down when the minimum gap is closed.

STALL MODE

The ammeter A connected between the wheel drive motor M and its power source incorporates a switch S4 which is closed when the current drawn by the motor exceeds a safe value. This excess of current is drawn when, for some unpredictable reason the gap closes beyond minimum and the work overloads the motor. Closing of the switch S1 short circuits both coils K1 and K2 of the electro-hydraulic valve and reduces fluid flow and the work carrier speed to zero or stall. Erosion then immediately widens the gap and returns the system to normal or entrance mode.

EXIT MODE

Eventually the wheel reaches the end of the workpiece and the gap signal rises above the threshold T. The system then slows down to entrance speed as the wheel finishes its erosive shaping.

SUMMARY

The control system herein disclosed depends for its operation upon three primary features, to wit, maintaining a continuous phase of electrolyte even to the point of virtual contact (zero gap); employing a signal for effecting the rate of feed which is independent of variables in the system that are not easily controlled; and continually seeking a minimal gap rather than a gap of predetermined width. The first of these is achieved by providing a wheel containing in its edge face a plurality of slots or their equivalent and supplying the electrolyte to the slot from externally of the wheel by a nozzle, or from internally of the wheel through radial passages, so that variation in the width of the gap will not influence the flow of electrolyte even when there is substantially no gap since a continuous phase of electrolyte is harbored within the slots in the wheel thus insuring continuous uninterrupted electrolytic action. For control signals the invention makes use of signals produced in the field between the wheel and workpiece at virtual contact which are of relatively high magnitude and steep gradient (fast rise time) to decrease the rate of feed of unidirectional feeding means, these signals being independent of the condition of the system; and in combination therewith other signals imposed on the field (imposed signals) by the rotating wheel which are also entirely independent of the electrolytic current flow and hence of any of the variables incident to the electrolytic dissolution and which have a gradient like the signals produced at virtual contact. These latter "imposed" signals are created by rotation of the wheel in the field and their frequency and magnitude depends upon the number of slots in the wheel and its rotation and also upon the confronting areas between the wheel and work and the width of the gap. At inception when the sharp edges of the slots confront the leading edge of the workpiece the "imposed" signals are highest due to the small areas of confrontation and are of substantially the same magnitude and gradient as the signals produced at virtual contact and as the areas of confrontation increase and the gap widens their magnitude decreases. The relatively high magnitude and steep gradient of the signals produced at virtual contact and at inception, on the one hand, and the signals of lower magnitude produced as the gap widens, on the other hand, enables selective control which initiates a response fast enough to prevent crash even at conditions of virtual contact. Finally, by alternately feeding the workpiece relative to the wheel at a rate faster than the rate of dissolution and at a rate slower than the rate of dissolution so as to constantly seek a minimal gap, but without contact, rather than to maintain a gap of predetermined width, maximum precision can be obtained.

At no gap, if this were possible, the workpiece would be the exact counterpart of the wheel and this is virtually what is obtained by the use of the apparatus and method herein described.

The system tends to maintain a maximum rate of dissolution, that is, shaping or cutting, because the rate of formation of the non-conductive product of dissolution on the surface of the workpiece follows so fast upon its removal therefrom by the rubbing action of the wheel that the slow down of the feeding movement is only momentary.

The apparatus herein disclosed makes possible not only shaping metals but cutting through a metal in the sense that one part of a sheet of metal can be separated from another by such electrolytic cutting and it is within the scope of the invention, in this latter aspect, to employ a tool embodying the character hereinbefore described which enables cutting a metal part by electrolytic action without contact of the tool with the metal part and, in addition, cutting teeth operable after the metal part has been cut by such electrolytic action to non-electrolytically cut a non-metallic part associated with the metal part. For example, the wheel may be provided with cutting teeth at the edges of the slots or a circular saw blade may be employed as the tool.

It should be understood that the present disclosure is for the purpose of illustration only and that this invention includes all modifications and equivalents which fall within the scope of the appended claims.

I claim:

1. In an apparatus for electrolytically shaping a metallic workpiece, the apparatus including means for holding the workpiece, an electrically conductive working electrode having an endless surface, means for movably supporting said working electrode, means for causing converging relative movement between said working electrode and the workpiece into confronting relation to establish a gap between said workpiece and a point on said endless surface closest to said workpiece, thereby defining a working space, means for moving said working electrode so that said point on said endless surface closest to said workpiece is maintained at a constant distance and direction from any predetermined point on said means for movably supporting said working electrode, means externally of said working electrode for cotinuously supplying electrolyte to said working space at the side of said working electrode where said endless surface approaches said working space, a source of electric current connected across said workpiece and said working electrode to make said workpiece predominantly anodic and cause an electric field to be produced across said gap, and means uniformly spaced along the endless surface of said working electrode and movable through said field for causing intermittent uniform changes in said field which in turn produce a continuous chain of electrical signals having an amplitude determined by the width of said gap; the improvement wherein said means for causing converging relative movement between said working electrode and said said workpiece includes means responsive to said signals for controlling the rate of said relative converging movement in inverse proportion to the amplitude of said signals.

2. The apparatus of claim 1 wherein said electrode is a wheel.

3. The apparatus of claim 1 wherein said means for causing intermittent changes in said field are substantially uniform inclined slots.

4. The apparatus of claim 1 wherein said means for causing intermittent changes in said field are equally spaced small inserts of insulating material.

5. The apparatus of claim 2 wherein said wheel is composed of one kind of metal, and said means for causing intermittent changes in said field are equally spaced small inserts of a metal having a composition different from said wheel.

6. Apparatus according to claim 2, wherein said means responsive to said signal includes switching means having at least two states in which it is operative to select for said feed means two different feed rates in the same direction.

7. Apparatus according to claim 6, wherein said switching means includes manually operable means to place the switching means in one of said states, and means responsive to variations in said electrical field for causing said switching means to change to another of said states.

8. Apparatus according to claim 6, wherein said means responsive to said signal comprises means for selecting for said feed means two speeds respectively faster and slower than the maximum rate at which the working element can remove material from the workpiece.

9. Apparatus according to claim 2, characterized by an electric motor for driving said working element, meter means for detecting overload of said motor when said element and workpiece approach contact, and swtich means operated by said meter means on overload, said switch means being connected to said last mentioned means to cause the latter to stop said drive means on overload.

10. Apparatus according to claim 1, wherein said means responsive to said signal comprises a circuit having input means receiving said recurrent variations, output means connected to said feed rate adjusting means, and a control channel connected between said input means and output means including switching means having at least two stable states in each of which it produces control signals of different amplitudes, said switching means being differently sensitive to recurrent variations of different amplitudes to change said switching means between said states.

11. Apparatus according to claim 10, wherein said control channel comprises gate means passing a control signal of predetermined amplitude, said switching means being connected to said gate means to transfer between two states in response to a control signal of said predetermined amplitude, and at least two voltage sources of different values, said switching means connecting one said source to the aforesaid output means in one of said states, and said switching means connecting the other of said sources to the output means in the other of said states.

12. Apparatus according to claim 11, wherein said control channel comprises a third voltage source, said switching means having a third state in which it respectively connects said third votlage source from said output means, and a manual switch for transferring said switching means to said third state while said working element and workpiece approach working relation with each other, said third voltage causing said adjusting means to increase the feed rate of said drive means, and said switching means being responsive to said control signal of said predetermined voltage on entrance of said working element into working relation with the workpiece to transfer the switching means to one of said two states thereby to reduce the feed rate of said drive means during entrance.

13. In an apparatus for electrolytically shaping a metallic workpiece, the apparatus including means for holding the workpiece, an electrically conductive working electrode having an endless surface, means for movably supporting said working electrode, means for causing converging relative movement between said working electrode and the workpiece into confronting relation to establish a gap between said workpiece and a point on said endless surface closest to said workpiece, thereby defining a working space, means for moving said working electrode so that said point on said endless surface closest to said workpiece, thereby defining a working space, means for moving said working electrode so that said point on said endless surface closest to said workpiece is maintained at a constant distance and direction from any predetermined point on said means for movably supporting said working electrode, means externally of said working electrode for continuously supplying electrolyte to said working space at the side of said working electrode where said endless surface approaches said working space, a source of electric current connected across said workpiece and said working electrode to make said workpiece predominantly anodic and cause an electric field to be produced across said gap, and means uniformly spaced along the endless surface of said working electrode and movable through said field for causing intermittent uniform changes in said field which in turn produce a continuous chain of electrical signals having an amplitude determined by the width of said gap; the improvement wherein said means for causing converging relative movement between said working electrode and said workpiece includes means responsive to the signals developed during the initial converging movement to decrease the rate of convergence until a predetermined area of said workpiece is subjected to electrolytic action, and thereafter to signals of predetermined lower amplitude when the gap exceeds a predetermined width to increase the rate of convergence of said working electrode with said workpiece, and to signals of relatively greater amplitude when the gap falls short of said predetermined width to increase the rate of convergence of said working electrode with said workpiece.

14. The method of electrolytically shaping a metallic workpiece comprising supporting said workpiece and an electrically conductive working electrode having an endless surface, effecting movement of said working electrode and converging relative movement of the working electrode and workpiece to establish and maintain a gap between them having a predetermined width thereby to define a working space and so that said endless surface continually moves through the points on said electrode most proximate to said workpiece, supplying electrolyte to said working space at the side of the electrode where said endless surface approaches said working space, connecting said working electrode and workpiece in an electrical circuit including the electrolyte such that the workpiece is predominantly anodic and cause an electric field to be produced across said gap, imposing on the field, by means uniformly spaced along the endless surface of the working electrode which moves through the field, intermittent uniform changes in said field which constitute electric signals having an amplitude which varies inversely with the width of the gap and employing said signals to control the rate of said relative converging movement in inverse proportion to the amplitude of said signals.

15. The method of claim 14 wherein said working electrode is a wheel.

16. The method of claim 14 wherein said means for causing intermittent changes in said field are substantially uniform inclined slots.

17. The method of claim 14 wherein said means for causing intermittent changes in said field are equally spaced small inserts of insulating material.

18. The method of claim 15 wherein said wheel is composed of one kind of metal, and said means for causing intermittent changes in said field are equally spaced small inserts of a metal having a composition different from said wheel.

References Cited

UNITED STATES PATENTS

| | | | |
|---|---|---|---|
| 2,764,543 | 9/1956 | Comstock et al. | 204—143 |
| 3,130,138 | 4/1964 | Faust et al. | 204—143 |
| 3,238,114 | 3/1966 | Halverstadt et al. | 204—224 |
| 3,280,016 | 10/1966 | Bass et al. | 204—143 |
| 3,332,864 | 7/1967 | Woods | 204—143 |
| 3,338,808 | 8/1967 | Johnson | 204—143 |

FOREIGN PATENTS 637,872    5/1950    Great Britain.

ROBERT K. MIHALEK, *Primary Examiner.*